(12) United States Patent
Seki et al.

(10) Patent No.: US 6,832,227 B2
(45) Date of Patent: Dec. 14, 2004

(54) DATABASE MANAGEMENT PROGRAM, A DATABASE MANAGING METHOD AND AN APPARATUS THEREFOR

(75) Inventors: Yumiko Seki, Toyonaka (JP); Masami Kameda, Yokohama (JP); Takeshi Fujii, Yokohama (JP); Yoshifumi Yamashita, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 337 days.

(21) Appl. No.: 10/046,981

(22) Filed: Jan. 17, 2002

(65) Prior Publication Data

US 2002/0116364 A1 Aug. 22, 2002

(30) Foreign Application Priority Data

Feb. 19, 2001 (JP) ........................................ 2001-041122

(51) Int. Cl.[7] .............................................. G06F 17/30
(52) U.S. Cl. ......................... 707/101; 707/10; 707/200
(58) Field of Search ................................ 707/101, 200, 707/10; 709/217

(56) References Cited

U.S. PATENT DOCUMENTS

| | | | | |
|---|---|---|---|---|
| 5,890,154 A | * | 3/1999 | Hsiao et al. ................... | 707/8 |
| 6,493,721 B1 | * | 12/2002 | Getchius et al. ......... | 707/104.1 |
| 6,606,685 B2 | * | 8/2003 | Huxoll ........................ | 711/118 |
| 2002/0007363 A1 | * | 1/2002 | Vaitzblit ..................... | 707/202 |
| 2002/0107837 A1 | * | 8/2002 | Osborne et al. ............... | 707/2 |

FOREIGN PATENT DOCUMENTS

JP          5-2515          1/1993

OTHER PUBLICATIONS

Chye lin Chee et al. "Adaptive Prefetching and Storage Reorganization In A Log–Structured Storage System" IEEE Transactions on Knowledge and Data Engineering, Oct. 1998, vol. 10, Issue 5, pp. 824–838.*

* cited by examiner

Primary Examiner—Jack Choules
(74) Attorney, Agent, or Firm—Mattingly, Stanger & Malur, P.C.

(57) ABSTRACT

Database optimizing method and system are provided to optimally locate data. Only data satisfying conditions desired by a user is extracted among an access log. Values of a part of the data are translated on the basis of a translation table, and aggregated on the basis of aggregation condition rules. The obtained aggregation result is presented to the user. In addition, data in the database are optimally relocated on the basis of the obtained aggregation result.

16 Claims, 23 Drawing Sheets

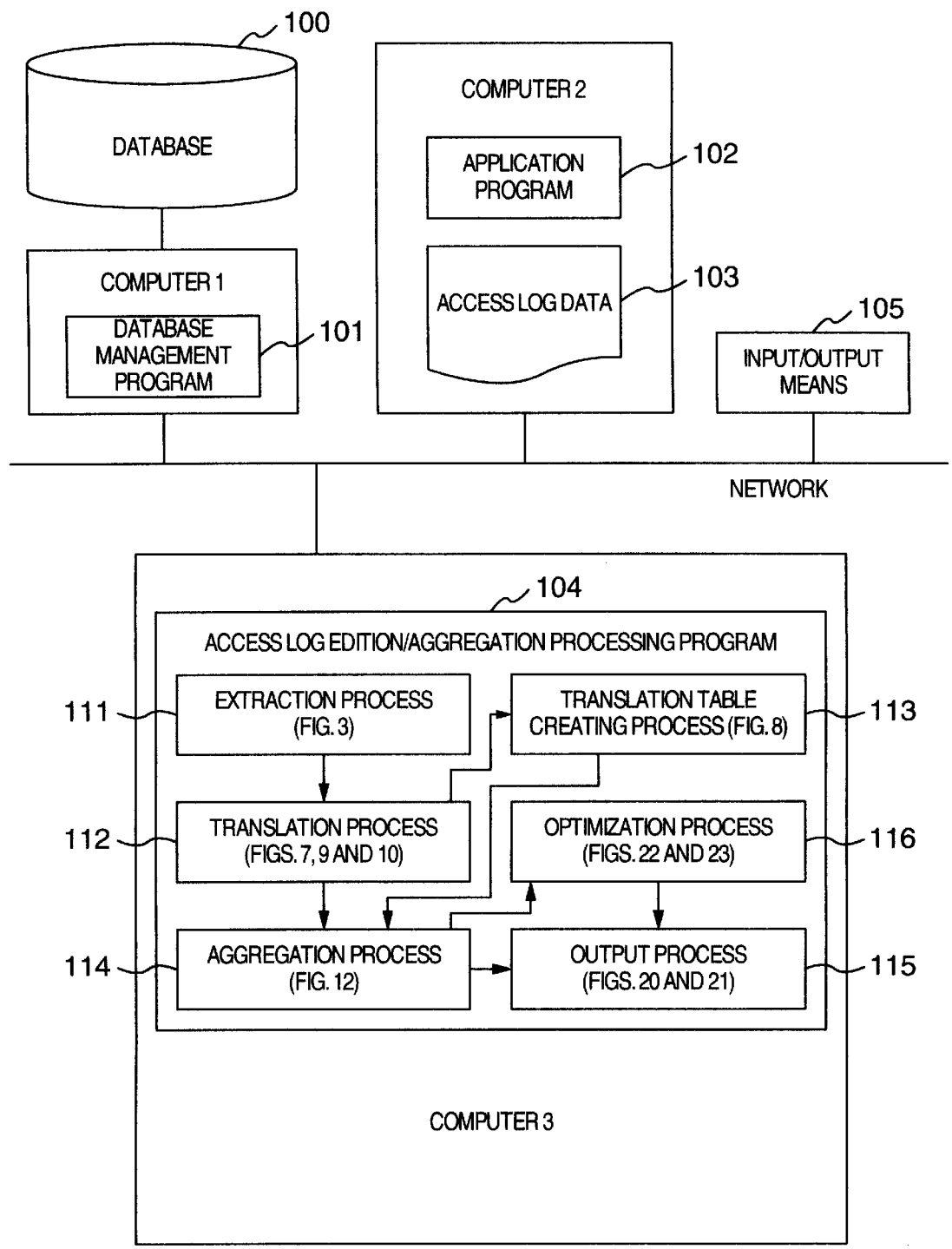

FIG.2

FORMAT EXAMPLE: yyy/mm/dd hh:mm:ss.ms UserID LogInformation1 LogInformation2 ...

```
06/19/2000 02:18:19.388 ACUser6 Pid051 CONNECT 673d2be0-d1fd-11d0-ab59-08002be29e1d
06/19/2000 02:18:52.261 ACUser6 Pid051 DISCONNECT
06/19/2000 02:19:16.420 ACUser6 Pid058 CONNECT 673d2be0-d1fd-11d0-ab59-08002be29e1d
06/19/2000 02:21:50.877 ACUser6 Pid058 CREATE OBJECT object_id:088901123
06/19/2000 02:22:37.607 ACUser6 Pid058 GET PROPERTIES object_id:088901123 (nil)
06/19/2000 02:22:54.537 ACUser6 Pid058 RELEASE OBJECT object_id:088901123
06/19/2000 02:36:13.963 ACUser6 Pid058 DISCONNECT
06/19/2000 02:50:16.420 ACUser3 Pid302 CONNECT 673d2be0-d1fd-11d0-ab59-08002be29e1d
06/19/2000 02:51:50.877 ACUser3 Pid302 CREATE OBJECT object_id:088901123
06/19/2000 02:52:37.607 ACUser3 Pid302 GET PROPERTIES object_id:088901123 (nil)
06/19/2000 02:52:54.537 ACUser3 Pid302 RELEASE OBJECT object_id:088901123
06/19/2000 02:13:52.963 ACUser3 Pid302 DISCONNECT
```

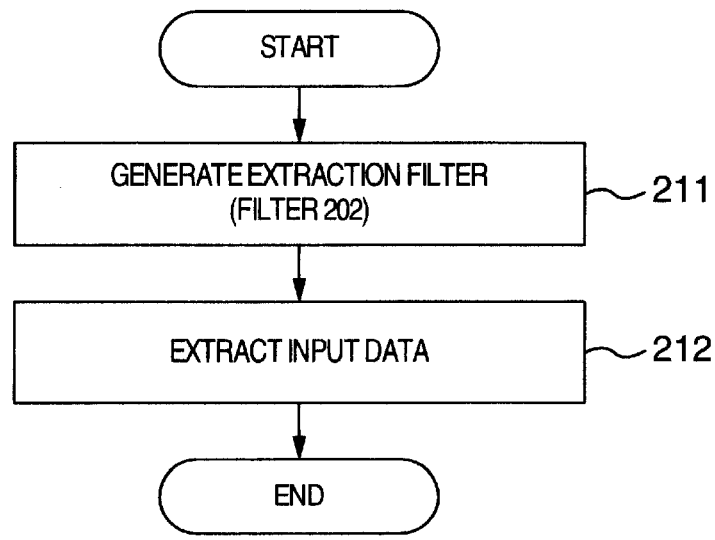

PRIORITY: TIME>USER>OBJECT>PROCESS ID>MESSAGE

EXTRACTION START TIME: NONE SPECIFIED
EXTRACTION END TIME: NONE SPECIFIED
EXTRACTION DURATION: 30 MINUTES
USER: ACUser 6 OR ACUser 3
OBJECT:
object_id:088901123
PROCESS ID: 0 OR MORE
MESSAGE: NORMAL SYSTEM

FIG.5

```
START_TIME=START_TIME;
END_TIME=START_TIME+DURATION;
DURATION=00:30;
USER="ACUser6" | | "ACUser3";
OBJECT=object_id:088901123;
PID=TRUE;
MESSAGE=NORMAL;
START_TIME=END_TIME;
```

```
06/19/2000 02:21:50.877 ACUser6 Pid058 CREATE OBJECT object_id:088901123
06/19/2000 02:22:37.607 ACUser6 Pid058 GET PROPERTIES object_id:088901123 (nil)
06/19/2000 02:22:54.537 ACUser6 Pid058 RELEASE OBJECT object_id:088901123
```

```
06/19/2000 02:52:37.607 ACUser3 Pid302 GET PROPERTIES object_id:088901123 (nil)
06/19/2000 02:52:54.537 ACUser3 Pid302 RELEASE OBJECT object_id:088901123
```

FIG.9

Rules

PRIORITY=USER>OBJECT

REPLACE ALL OBJECT ID'S WITH OBJECT NAMES
REPLACE ANY OBJECT ID WITH ANOTHER PROPERTY ATTRIBUTE
WHEN OBJECT NAME IS NOT ALLOTTED TO THE OBJECT ID
REPLACE ALL USER ID'S WITH USER NAMES
DON'T REPLACE ANY USER ID
WHEN USER NAME IS NOT ALLOTTED TO THE USER ID

FIG.10

Rules

Key1=UserID;
ACUser6,
ACUser3

Key2=ObjectID;
object_id:088901123

| Key | Target Value | Translated Value |
|---|---|---|
| UserID | ACUser6 | TARO YAMADA |
| UserID | ACUser3 | HANAKO HITACHI |
| ObjectID | object_id:088901123 | FUNCTION SPECIFICATIONS |

FIG.13

| UserID | Pid | Command | ObjectID |
|---|---|---|---|
| TARO YAMADA | Pid058 | CREATE OBJECT | FUNCTION SPECIFICATIONS |
| TARO YAMADA | Pid058 | GET PROPERTIES | FUNCTION SPECIFICATIONS |
| TARO YAMADA | Pid058 | RELEASE OBJECT | FUNCTION SPECIFICATIONS |

FIG.14A

AGGREGATE IN USER UNIT
SET COMMANDS AS AGGREGATION TARGET
SET TIMES AS AGGREGATE UNIT
AGGREGATE COMMANDS AS THE SAME COMMAND EVEN IF THE COMMANDS ARE THE SAME BUT DIFFERENT IN OTHER CONDITIONS
AGGREGATE TOTALLY IN ALL USERS

FIG.14B

AGGREGATE IN USER UNIT AND IN OBJECT UNIT
PRIORITY=USER>OBJECT
SET COMMANDS AS AGGREGATION TARGET
SET TIMES AS AGGREGATE UNIT
AGGREGATE COMMANDS AS THE SAME COMMAND EVEN IF THE COMMANDS ARE THE SAME BUT DIFFERENT IN OTHER CONDITIONS
AGGREGATE TOTALLY IN ALL USERS

FIG.15A

```
Start   = Date    hh:mm:ss
End     = Date    hh:mm:ss
------------------------------------------------
Key1            Target          Summary Unit
------------------------------------------------
Subtotal
------------------------------------------------
Total           Target          Summary Unit
```

FIG.15B

```
Start   = Date    hh:mm:ss
End     = Date    hh:mm:ss
------------------------------------------------------------
Key1            Key2            Target   Summary Unit
                Key2            Target   Summary Unit
------------------------------------------------------------
Subtotal        -------         Target   Summary Unit
------------------------------------------------------------
Key1            Key2            Target   Summary Unit
                Key2            Target   Summary Unit
------------------------------------------------------------
Subtotal        -------         Target   Summary Unit
------------------------------------------------------------
Total           -------         Target   Summary Unit
```

FIG.16A
AGGREGATION FILTER (one key)

Key=Key1;
Key1=UserID;
Target=Command;
Summary Unit=Count;
Subtotal=Yes;
Total=Yes;
Others=Invalid;

FIG.16B
AGGREGATION FILTER (two keys)

Key=Key1,Key2;
Key1=UserID;
Key2=ObjectID;
Target=Command;
Summary Unit=Count;
Subtotal=Key1;
Total=Key2;
Others=Invalid;

FIG.17

```
Start = 06/19/2000 02:21:50.877
End   = 06/19/2000 02:22:54.537
```

| UserID | ObjectID | Command | Count |
|---|---|---|---|
| TARO YAMADA | FUNCTION SPECIFICATIONS | CREATE OBJECT | 1 |
|  | FUNCTION SPECIFICATIONS | GET PROPERTIES | 1 |
|  | FUNCTION SPECIFICATIONS | RELEASE OBJECT | 1 |

| Subtotal | ------ | Command | Count |
|---|---|---|---|
|  |  | CREATE OBJECT | 1 |
|  |  | GET PROPERTIES | 1 |
|  |  | RELEASE OBJECT | 1 |

```
Start = 06/19/2000 02:52:37.607
End   = 06/19/2000 02:52:54.537
```

| UserID | ObjectID | Command | Count |
|---|---|---|---|
| HANAKO SATO | FUNCTION SPECIFICATIONS | GET PROPERTIES | 1 |
|  | FUNCTION SPECIFICATIONS | RELEASE OBJECT | 1 |

| Subtotal | ------ | Command | Count |
|---|---|---|---|
|  |  | GET PROPERTIES | 1 |
|  |  | RELEASE OBJECT | 1 |

| Total | ------ | Command | Count |
|---|---|---|---|
|  |  | CREATE OBJECT | 1 |
|  |  | GET PROPERTIES | 2 |
|  |  | RELEASE OBJECT | 2 |

FIG.18A

AGGREGATE IN USER UNIT
SET DOCUMENT PROCESSING COMMANDS ←── VALUE SPECIFIED
AS AGGREGATION TARGET                  BY USER IS USED
SET TIMES AS AGGREGATE UNIT            AS AGGREGATION TARGET
AGGREGATE COMMANDS AS THE SAME COMMAND EVEN
IF THE COMMANDS ARE THE SAME BUT DIFFERENT IN OTHER
CONDITIONS AGGREGATE TOTALLY IN ALL USERS

FIG.18B

Key=Key1;

Key1=UserID;

Target=Customised_Command_Table_1; ←── POINTER TO AGGREGATION
Summary Unit=Count;                      TARGET DEFINITION TABLE Subtotal=Yes;

Total=Yes;

Others=Invalid;

FIG.19

| INFORMATION OF INPUT DATA | | AGGREGATION CLASSIFICATION (BY PROPERTY OF DOCUMENT PROCESSING COMMAND) | | | | | | |
|---|---|---|---|---|---|---|---|---|
| COMMAND | ARGUMENT | CONNECT | SEARCH | CREATE | DELETE | REFER | UPDATE | ERROR |
| BIND | | | | | | | | |
| CHANGE | | | | | | | ○ | |
| CHECKIN | | | | | | | ○ | |
| CHECKOUT | | | | | | | ○ | |
| CONNECT | | ○ | | | | | | |
| CREATE | OBJECT | | | ○ | | | | |
|  | OTHERS | | | | | | ○ | |
| DELETE | OBJECT | | | | ○ | | | |
|  | OTHERS | | | | | | ○ | |
| DOWNLOAD | | | | | | | | |
| ERROR | | | | | | | | ○ |
| EXECUTE | SEARCH | | ○ | | | | | |
| GET | RESULT | | ○ | | | | | |
|  | OTHERS | | | | | ○ | | |
| LINK | | | | | | ○ | | |
| LIST | | | | | | ○ | | |
| REVOKE | | | | | | | ○ | |
| SET | | | | | | | ○ | |
| UNBIND | | | | | | | ○ | |
| UNLINK | | | | | | | ○ | |
| UPLOAD | | | | | | | ○ | |

FIG.20

```
Start  = 06/19/2000 02:21:50.877
End    = 06/19/2000 02:22:54.537
```

| UserID | ObjectID | DOCUMENT PROCESSING COMMAND | Count |
|---|---|---|---|
| TARO YAMADA | FUNCTION SPECIFICATIONS | CREATE | 1 |
| | FUNCTION SPECIFICATIONS | REFER | 1 |
| | FUNCTION SPECIFICATIONS | CONNECT | 1 |

| Subtotal | ------- | DOCUMENT PROCESSING COMMAND | Count |
|---|---|---|---|
| | | CREATE | 1 |
| | | REFER | 1 |
| | | CONNECT | 1 |

```
Start  = 06/19/2000 02:52:37.607
End    = 06/19/2000 02:52:54.537
```

| UserID | ObjectID | DOCUMENT PROCESSING COMMAND | Count |
|---|---|---|---|
| HANAKO SATO | FUNCTION SPECIFICATIONS | REFER | 1 |
| | FUNCTION SPECIFICATIONS | CONNECT | 1 |

| Subtotal | ------- | DOCUMENT PROCESSING COMMAND | Count |
|---|---|---|---|
| | | REFER | 1 |
| | | CONNECT | 1 |

| Total | ------- | DOCUMENT PROCESSING COMMAND | Count |
|---|---|---|---|
| | | CREATE | 1 |
| | | REFER | 2 |
| | | CONNECT | 2 |

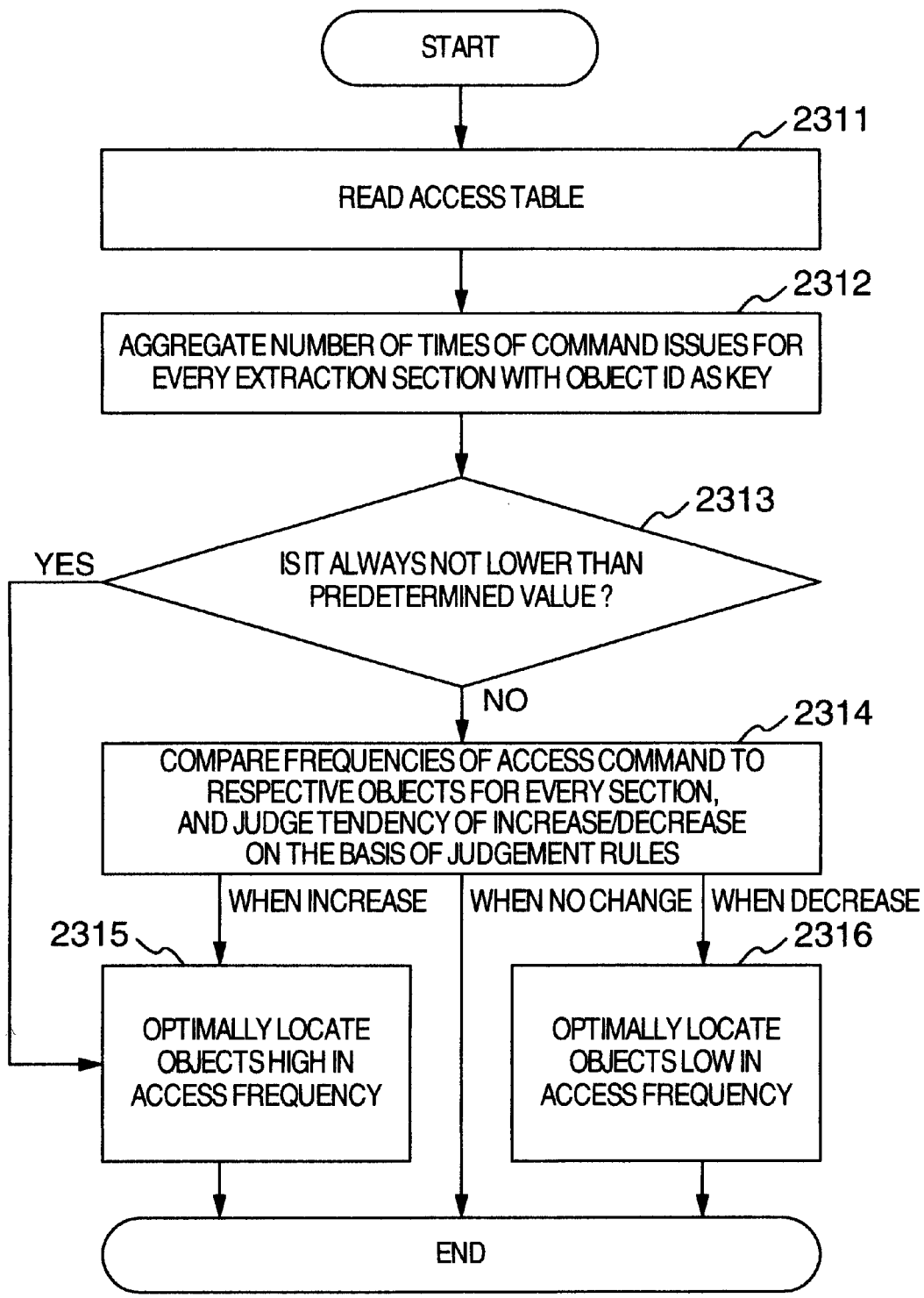

FIG.23

| EVENT | DIFFERENCE BETWEEN SECTION A AND SECTION B | DIFFERENCE BETWEEN SECTION B AND SECTION C | JUDGEMENT OF INCREASE/DECREASE |
|---|---|---|---|
| WHEN OBJECT IS DELETED DURING EXTRACTION SECTION | — | — | DECREASE |
| WHEN OBJECT IS PRESENT DURING EXTRACTION SECTION | ACCESS INCREASE | ACCESS INCREASE | INCREASE |
| | ACCESS INCREASE | NO CHANGE | |
| | ACCESS INCREASE | ACCESS DECREASE | NO CHANGE |
| | NO CHANGE | NO CHANGE | |
| | NO CHANGE | ACCESS DECREASE | DECREASE |
| | ACCESS DECREASE | ACCESS DECREASE | |

FIG.27

OPTIMIZATION PROCESS

| EVENT | ACCESS FREQUENCY | PROCESSING |
|---|---|---|
| WHEN EXISTENCE TIME OF OBJECT IS SHORTER THAN 50% OF AVERAGE LIFE | INCREASE | LOAD OBJECT INTO CACHE<br>GIVE PRIORITY TO DOCUMENT PROCESSING COMMANDS<br>INCREASE PROCESS PRIORITY<br>NECESSARY TO CREATE OBJECT INDEX |
| WHEN EXISTENCE TIME OF OBJECT EXCEEDS 50% OF AVERAGE LIFE | NO CHANGE | RELEASE CACHE<br>RETURN DOCUMENT PROCESSING COMMAND TO NORMAL LEVEL<br>RETURN PROCESS TO NORMAL LEVEL |
| WHEN EXISTENCE TIME OF OBJECT EXCEEDS 75% OF AVERAGE LIFE | DECREASE | SAVE OBJECT ON BACKUP<br>RETURN DOCUMENT PROCESSING COMMAND TO NORMAL LEVEL<br>REDUCE PROCESS PRIORITY |

FIG.29

| EVENT | ACCESS FREQUENCY | PROCESSING |
|---|---|---|
| WHEN EXISTENCE TIME OF OBJECT IS SHORTER THAN 50% OF AVERAGE LIFE | INCREASE | LOAD OBJECT INTO CACHE<br>GIVE PRIORITY TO DOCUMENT PROCESSING COMMANDS<br>INCREASE PROCESS PRIORITY<br>NECESSARY TO CREATE OBJECT INDEX |
| | | GIVE PRIORITY TO COMMANDS FOR UPDATE PROCESSING<br>GIVE PRIORITY TO PROCESS FOR UPDATE PROCESSING<br>GIVE PRIORITY TO PROCESS FOR EXCLUSIVE CONTROL |
| WHEN EXISTENCE TIME OF OBJECT EXCEEDS 50% OF AVERAGE LIFE | NO CHANGE | RELEASE CACHE<br>RETURN DOCUMENT PROCESSING COMMAND TO NORMAL LEVEL<br>RETURN PROCESS TO NORMAL LEVEL |
| | | GIVE PRIORITY TO COMMANDS FOR REFERENCE PROCESSING<br>GIVE PRIORITY TO PROCESS FOR REFERENCE PROCESSING<br>REDUCE PRIORITY OF PROCESS FOR EXCLUSIVE CONTROL |
| WHEN EXISTENCE TIME OF OBJECT EXCEEDS 75% OF AVERAGE LIFE | DECREASE | SAVE OBJECT ON BACKUP<br>RETURN DOCUMENT PROCESSING COMMAND TO NORMAL LEVEL<br>REDUCE PROCESS PRIORITY |
| | | GIVE PRIORITY TO COMMANDS FOR SEARCH PROCESSING<br>GIVE PRIORITY TO PROCESS FOR SEARCH PROCESSING<br>NECESSARY TO CREATE INDEX FOR SEARCH<br>PROHIBIT EXCLUSIVE CONTROL |

DATABASE MANAGEMENT PROGRAM, A DATABASE MANAGING METHOD AND AN APPARATUS THEREFOR

BACKGROUND OF THE INVENTION

The present invention relates to a database, and particularly relates to a database management program, a database managing method and a database managing system for carrying out rearrangement of a database or the like on the basis of log information showing access status to data.

As a conventional database optimizing system based on trace information, there is a database optimizing/rearranging system as disclosed in JP-A-5-2515. In this system, information of a method for gaining access to a database at data operation requests issued from respective user programs is accumulated as trace information. When the database is rearranged at regular time intervals, the optimum storage order of data in the database and the necessity of an index are determined with reference to the accumulated trace information. Thus, buffer quantity assignment parameters are created for securing a buffer quantity required for rearranging the database.

SUMMARY OF THE INVENTION

In the above-mentioned conventional technique, description is made on a method for optimizing and storing the order of columns, the order of lines and the necessity of creating an index in a database on the basis of access frequency. Such processing is carried out automatically routinely, and information is not disclosed to any user. Therefore, the user does not know what standard is used and what is optimized. Thus, classification between the case to optimize and the case not to optimize about one item cannot be defined by the judgement of the user. In addition, for the optimization of the database, the order of columns or the order of lines is merely changed or creation of an index is merely designated. That is, only static optimization is carried out, and description is not made on any dynamic optimization method in which optimization is carried out in accordance with the behavior of the system always undergoing a variation.

It is an object of the present invention to provide a method and a system for supporting user's database management to optimize the system dynamically, and a program for carrying out the support.

Further, it is another object of the invention to provide a database optimizing method which can optimize various conditions such as priorities of data, storage places, storage methods, management of resources, indexes, priorities of jobs, and so on, in accordance with optimization rules defined by a user on the basis of a disclosed optimization criterion (reference).

In order to achieve the foregoing objects, database managing means according to one aspect of the invention has a function to extract log information satisfying predetermined conditions from among log information of application programs having accessed to a database, and a function to rearrange data in the database in accordance with predetermined rules on the basis of commands included in the extracted log information.

Other objects, features and advantages of the present invention will become apparent from the description of the embodiments of the invention taken in conjunction with the accompanying drawings.

BRIEF DESCRIPTION OF THE DRAWINGS

FIG. 1 is a block diagram showing the configuration of a database managing system according to an embodiment of the present invention;

FIG. 2 is a diagram showing an example of an access log;

FIG. 3 is a flow chart of an extraction process;

FIG. 4 is a diagram showing an example set of definitions of extraction conditions;

FIG. 5 is a diagram showing an example of an extraction filter;

FIG. 9 is a diagram showing an example set of translation rules;

FIG. 10 is a diagram showing an example of a translation source list;

FIG. 13 is a diagram showing an example of an access table;

FIGS. 14A and 14B are diagrams showing example sets of aggregation condition rules respectively;

FIGS. 15A and 15B are diagrams showing examples of aggregation templates respectively;

FIGS. 16A and 16B are diagrams showing examples of aggregation filters respectively;

FIG. 17 is a diagram showing an example of an aggregation result;

FIGS. 18A and 18B are diagrams showing an example set of aggregation condition rules and an example of an aggregation filter respectively;

FIG. 19 is a diagram showing an example of an aggregation target definition table;

FIG. 20 is a diagram showing an example of an aggregation result output using the aggregation target definition table;

FIG. 22 is a flow chart of an optimization process;

FIG. 23 is a diagram showing an example set of judgement rules for optimization;

FIG. 27 is a diagram showing an example set of judgement rules for the object life cycle analyzing process;

FIG. 29 is a diagram showing another example set of judgement rules for the object life cycle analyzing process.

DETAILED DESCRIPTION OF THE EMBODIMENTS

Figures 6A, 6B, 7:
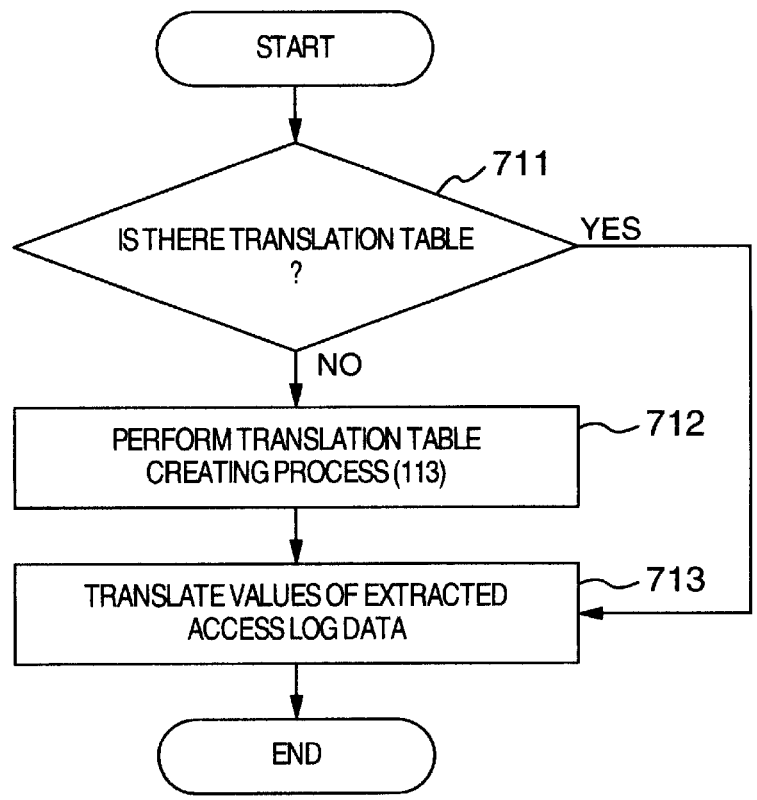
FIGS. 6A and 6B are diagrams showing examples of extracted data respectively.
FIG. 7 is a flow chart of a translation process.

Embodiments of the present invention will be described below with reference to the drawings.

FIG. 1 shows the configuration of a database managing system according to an embodiment of the present invention. A computer 1 has a database management program 101 for storing data into a database 100, and updating and reading the data from the database 100. A computer 2 has an application program 102 and outputs a data read request, a data update request and a data store request to the computer 1 in accordance with necessity. The computer 2 also stores access log data 103 showing the access status to the database in accordance with the execution of the application program 102. A computer 3 has an access log edition/aggregation processing program 104. The access log edition/aggregation processing program 104 fetches the access log data from the computer 2, and edits, aggregates and analyzes the access log data. Then, on the basis of the result of the analysis, the access log edition/aggregation processing program 104 determines the optimized location of data in the database, the priorities of commands, and so on. The access log edition/aggregation processing program 104 has respective programs for an extraction process 111, a translation process 112, a translation table creating process 113, an aggregation process 114, an output process 115 and an optimization process 116. In the extraction process 111, information is extracted from the access log on desired conditions. In the translation table creating process 113, a translation table for translating values of the extracted part of data is created on the basis of translation rules defined by a user. In the translation process 112, data is translated on the basis of this translation table. In the aggregation process 114, aggregation is performed on the extracted data or the translated data. In the output process 115, the result of the aggregation is outputted to an internal memory or external input/output means. In the optimization process 116, data is optimally located on the basis of the result of the aggregation. Input/output means 105 forms a part of a user terminal, and is connected to be able to communicate with the respective computers 1 to 3 which are connected to each other over a network.

FIG. 2 shows an example of the access log outputted by the application program. In this format of the log, access date and time, user ID, and log information (including process ID, command, and object targeted by command) are outputted.

Upon reception of the access log from the computer 2, the computer 3 starts to execute the access log edition/aggregation processing program 104.

FIG. 3 shows a flow of the extraction process 111. When the computer 3 receives the access log data 103, the computer 3 executes the processing program 104 to create an extraction filter (211). The extraction filter is created with extraction keys and conditional expressions defined on the basis of the extraction condition rules defined by the user. Next, the extraction filter is used to extract required access log data from the access log data 103 (212).

FIG. 4 shows an example set of extraction conditions. These extraction conditions are set or established by the user. In this example, the priority of data extraction is set by time>user>object>process ID>message. Thus, the data extraction is processed according to this priority. Since both start time and end time have not been specified for the time assignment having highest priority, the start time and the end time of input data are used as they are. Since the extraction duration is defined to be 30 minutes, extraction is carried out every 30 minutes. That is, data is extracted every 30 minutes in a section from the start time of the access log data 103 to the end time thereof. The user extraction condition is ACUser6 or ACUser3. Accordingly, only access logs of these users are extracted. As for objects, specified objects (only one in this example) are extracted. In addition, extraction conditions are also defined for process IDs and messages respectively. An extraction filter for extracting access log data satisfying all the extraction conditions is created in the extraction process 211.

FIG. 5 shows an example of the extraction filter. This extraction filter is created on the basis of the extraction conditions of FIG. 4. Extraction start time START_TIME of the extraction filter is in agreement with start time START_TIME of first input data. Extraction end time END_TIME is in agreement with the start time plus extraction duration (DURATION), that is, 30 minutes after the start of the log. First, input data is divided in this first 30-minute section. Data is extracted from every divided section on the conditions of the extraction filter. When START_TIME is replaced by END_TIME at last, the end time is set by END_TIME=START_TIME+DURATION from the next time, and the extraction processing is carried out on data in the next 30-minute section.

FIGS. 6A and 6B show examples of extracted data. The data is extracted from the access log data of FIG. 2 by the extraction filter shown in FIG. 5. FIG. 6A shows extracted data in Extraction Section 1, that is, in the first 30-minute section. FIG. 6B shows extraction data in Extraction Section 2, that is, in the next 30-minute section.

FIG. 7 shows a flow chart of the translation process 112 in FIG. 1.

It is confirmed whether a translation table is present or absent (711). If absent, a translation table is created (113). If the user prepares a translation table, or if a translation table has been created before, the values of the extracted access log data are translated with reference to the translation table (713).

Figure 8:
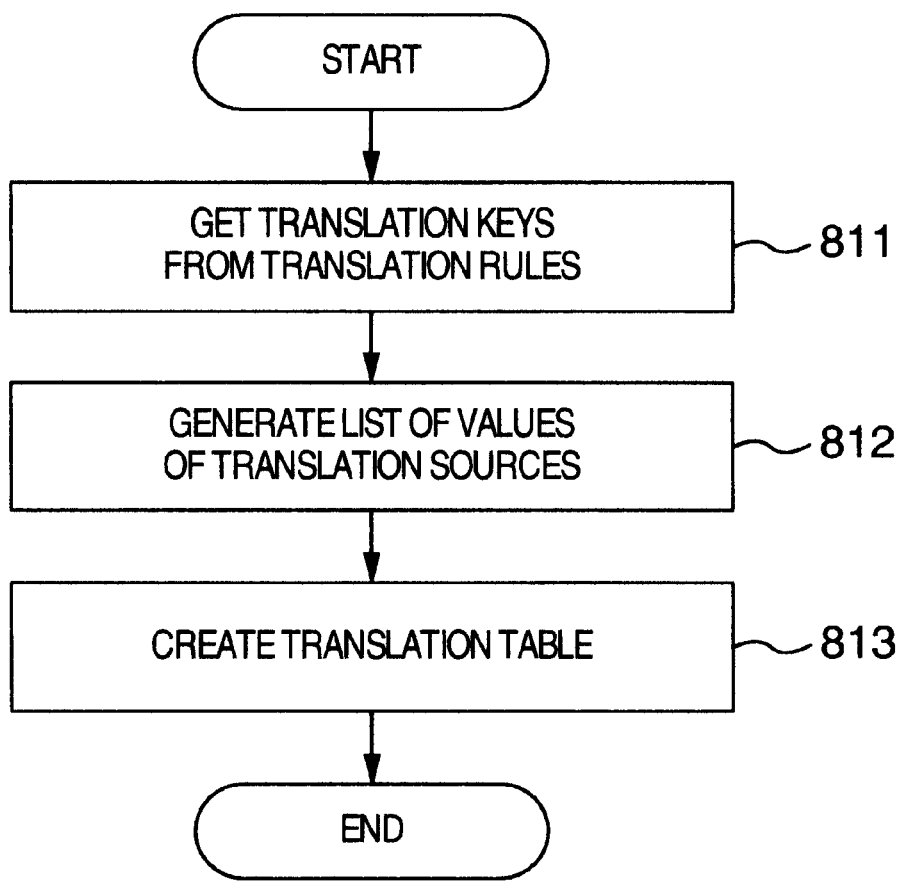
FIG. 8 is a flow chart of a translation table creating process.

FIG. 8 shows a flow chart of the translation table creating process 113. Translation keys are obtained with reference to translation rules defined by the user in advance (811). The translation keys are generic terms of data to be translated in this process. See FIGS. 9 to 11.

FIG. 9 shows an example set of the translation rules. Here, the translation keys are user ID and object ID. The method of translation will be described. Translation of users is prior to translation of objects. All the IDs of the objects are replaced by object names. In addition, if an object name is not allotted to an object ID, the object ID is replaced by another property. All the IDs of users are replaced by user names. In addition, if a user name is not allotted to a user ID, the user ID is not replaced but used as it is.

Next, values corresponding to the translation keys (for example, user ID and object ID) are obtained from the extracted access log data so as to create a list of values of translation sources (812).

FIG. 10 shows an example of the list of values of translation sources. Key1 designates a translation key user ID having priority, and Key2 designates an object ID. For example, translation sources of user IDs in Key1 are two values, ACUser6 and ACUser3.

Next, the translation source list is used to access the computer 1, and values of accessible translation destinations are obtained to create a translation table (813).

Figures 11, 12:
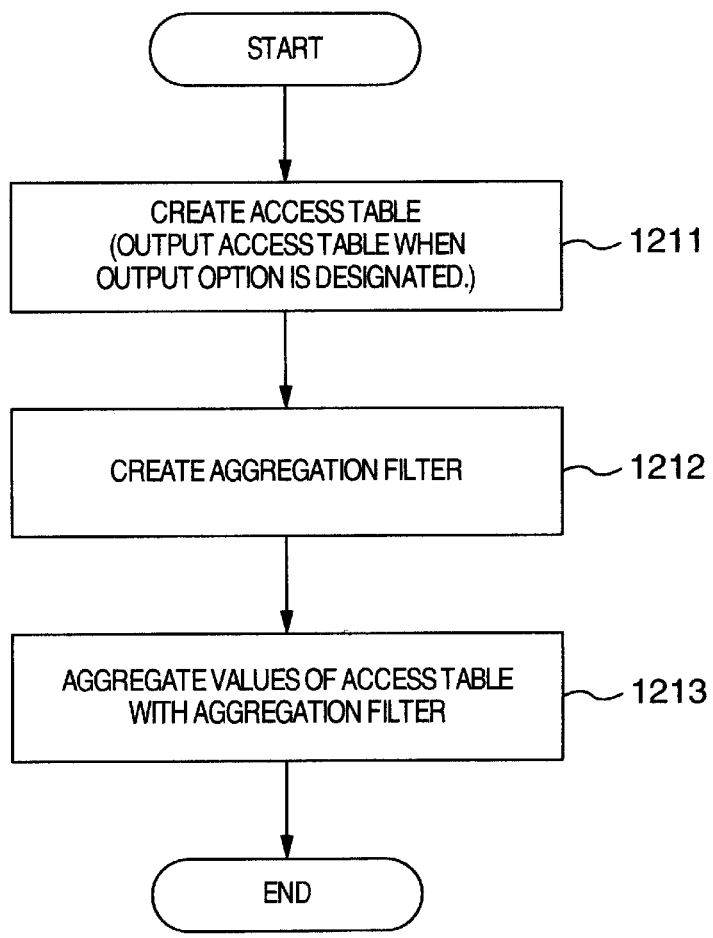
FIG. 11 is a diagram showing an example of a translation table.
FIG. 12 is a flow chart of an aggregation process.

FIG. 11 shows an example of the translation table. In this example, it is prescribed that the user ID ACUser6, the user ID ACUser3 and the object ID which are translation keys are translated into the user name "Taro Yamada", the user name "Hanako Hitachi" and the object name "functional specifications", respectively. The values of translation destinations (Translated Values) of this table are obtained with reference to values stored in the database. Accordingly, if this process does not have access authority to the data, the process cannot obtain the values of translation destinations. Thus, the translation keys are not translated but left as they are. Although a translation table can be created by reading from the database, the user can prepare a translation table specially. For example, if the user wants user names, object names and so on not to be known for the purpose of security guarantee, such translation keys in the translation table may be translated into random numbers or ciphers.

FIG. 12 shows a flow chart of the aggregation process 114. In the aggregation process, either the extracted data or the translated data can be specified as input data. If it cannot be confirmed that either data is present, an error message is outputted, and the process is terminated.

First, specified data is read as input data, and an access table (FIG. 13) for aggregation is created on a memory (1211). Here, when the output of the access table is designated, this access table is outputted to the external input/output unit. FIG. 13 shows an example of the access table. In the access table, columns are made up for every item included in input information. The input information is developed on the table, and used to carry out subsequent calculation repeatedly at a high speed.

If the access table has been created, an aggregation filter is created along aggregation condition rules and an aggregation template (1212).

Each of FIGS. 14A and 14B shows an example set of the aggregation condition rules. FIG. 14A shows an example set when there is one aggregation key. FIG. 14B shows an example set when there are two aggregation keys. In the example where there are two aggregation keys, aggregation is defined as follows. That is, aggregation is carried out in user unit and in object unit. Objects are subject to the aggregation. The unit of aggregation is the number of times of command issue. Commands different in conditions other than commands themselves are aggregated as the same command. Finally, the total sum of results of all users is calculated. Aggregation condition rules may be predetermined as default values for the system, or may be defined individually by users.

Each of FIGS. 15A and 15B shows an example of the aggregation template with which the aggregation result is outputted. FIG. 15A shows a template when there is one aggregation key. FIG. 15B shows a template when there are two aggregation keys. These templates are assumed to be outputted to an input/output screen or a file. However, information listed here may be outputted as a file in a CSV format. An aggregation template may be predetermined as a default value for the system, or may be defined individually by users.

Each of FIGS. 16A and 16B shows an example of the aggregation filter. FIG. 16A shows the case where there is one aggregation key. FIG. 16B shows the case where there are two aggregation key. In the previous example, there are two aggregation keys, Key1 and Key2, and user ID is defined as a high priority key (Key1) by way of example.

Returning to the description of FIG. 12, values in the access table are aggregated through the aggregation filter created in the step 1212 (1213). The aggregation result is outputted to the external input/output means 105 by the output process 115, or stored in a memory or a buffer. Thus, the aggregation process 114 is terminated.

Figure 21:
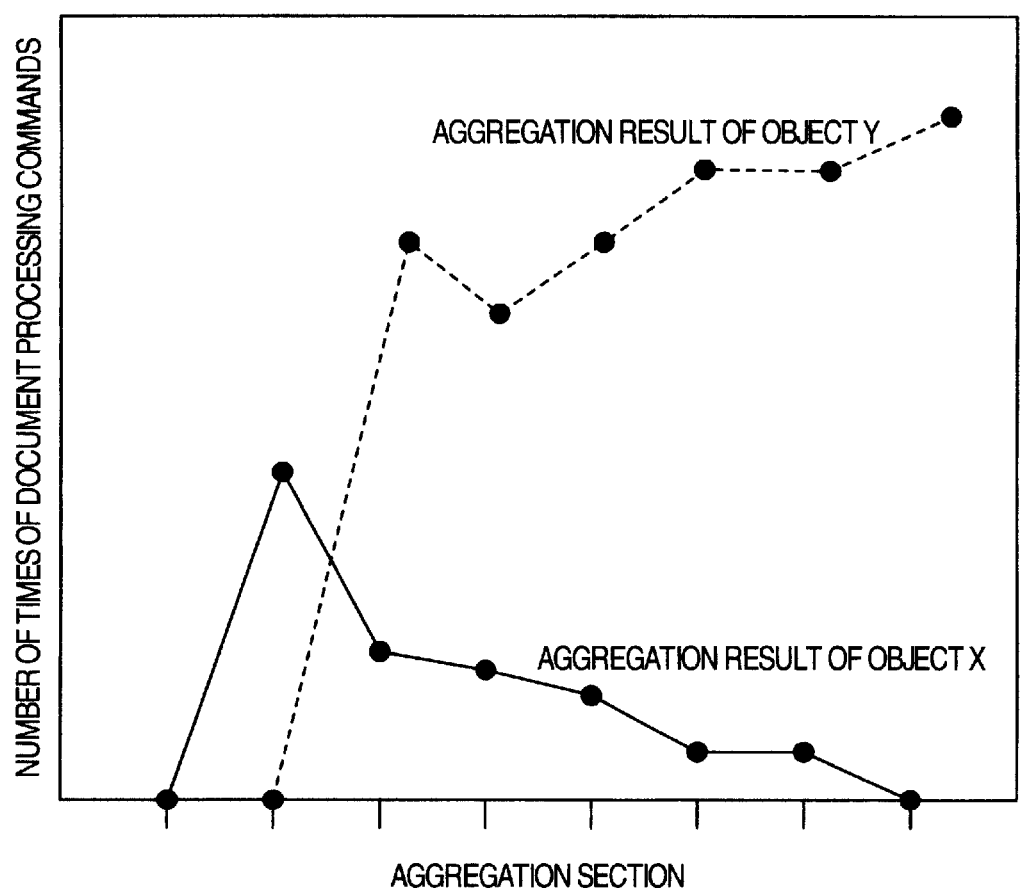
FIG. 21 is an illustration showing an example of another output format of the aggregation result by a screen image.

FIG. 17 shows an example of the outputted aggregation result. First, the number of times of command issues is aggregated for every user and for every object in Section 1. Next, the number of times of command issues is aggregated for every user and for every object in Section 2. Finally, the numbers of times of command issues is aggregated totally. Values specified by the user as shown in FIG. 18A may be used as the aggregation condition rules for the aggregation. In the example of FIG. 18A, the aggregation condition rules are specified so that aggregation is carried out with document processing commands as aggregation targets. An aggregation target definition table (FIG. 18A) in which the correspondence between document processing commands and access commands is defined is Customised_Command_Table_1 in the aggregation filter (FIG. 18B). FIG. 19 shows an example of the aggregation target definition table. In this example, the access commands are defined to be classified into seven kinds of document processing commands. For example, a command EXECUTE SEARCH and a command GET RESULT are classified into search commands because both of the commands search a document similarly. FIG. 20 shows the result of aggregation classification using the aggregation target definition table of FIG. 19. The aggregation result is outputted while the aggregation targets are not commands but replaced by document processing commands. FIG. 21 shows an output example of the aggregation result when the aggregation template is a graph image. Here, the numbers of issues of document processing commands are graphed and outputted for two objects X and Y. Comparing these two graphs with each other, the user can know easily which object is higher in access frequency. If the user wants to optimize the location about data with a high access frequency or data with a low access frequency, the optimization process 116 is carried out as follows.

FIG. 22 shows a flow of the optimization process 116. The access table is read (2311), and the number of command issues is aggregated for every extraction section with the object ID as a key (2312). If it is concluded in Step 2313 that the number of accesses is always beyond a predetermined value in each of the sections, the access frequency is regarded as high, and the location of objects is optimized. If such a conclusion is not made in Step 2313, the frequency of access commands to each object is compared for every section, and the tendency of increase/decrease in frequency of access commands is judged on the basis of judgement rules (FIG. 23) for optimization.

FIG. 23 shows an example set of the judgement rules. The judgement rules may be determined by individual users. The example of FIG. 23 shows the case where there are an even number of sections. Incidentally, in this example, if there are an odd number of sections, the number of increases and the number of decreases in differences for each section are compared with each other, and the large number is selected. If there are an even number, judgement of increase/decrease is performed as illustrated in this drawing.

Next, as a result of judgement (2314), the location of an object judged to be high in access frequency is optimized (2315). Some examples will be shown about such optimized location. First, an object judged to be high in access frequency is stored from the database into a cache memory or a buffer memory in the computer 1. Thus, it is possible to provide high-speed access to the object judged to be high in access frequency.

In addition, the priority of a process for the object judged to be high in access frequency is increased. For example, this is effective in the case where the computer 1 is designed to receive access requests from a plurality of computers 2, and the computer 1 executes a process in accordance with priority given thereto in order to carry out processing efficiently. In this case, the access log edition/aggregation program sends the computer 1 the object judged to be high in access frequency and the priority for the object. In the computer 1, the priority and the object sent thereto are stored. Then, when a command for the object is sent, processing is carried out in accordance with the stored priority.

In addition, the computer 1 may be requested to create an index for the object judged to be high in access frequency. Alternatively, in another method, an object column or line judged to be high in access frequency may be relocated. When a plurality of objects are accessed with a high frequency by one application, the access is gained at a high speed if these objects are stored together. If data is distributed and stored in a plurality of databases, these plurality of objects may be stored in different databases. In such a case, databases to be accessed are distributed, and there is no fear that accesses are concentrated on one database. Thus, data can be read at a high speed.

On the contrary, an object judged to be low in access frequency is subject to processing of optimized location, such as decreasing the stored order of the object, storing the object in a lower-rank storage, or reducing the priority of a process (2316). Thus, the priority of a process or the stored position of an object is changed in accordance with the access frequency so that the efficiency is improved in the database system as a whole.

Incidentally, the whole of the above-mentioned processing may be carried out as a batch job automatically at predetermined time intervals.

It has been known that an access log usually has an enormous volume of data beyond gigabytes. By the extraction process in this embodiment, processing can be performed on only required data extracted from a large volume of access log information. Accordingly, there is an effect that the processing can be carried out at a high speed or resources can be saved.

In addition, any identifier inside the database is defined uniquely in order to enhance the processing performance, and the value of the identifier is often a string of characters undecipherable for users. By the translation process in this embodiment, the access log information can be outputted to be replaced by expression decipherable for users. Thus, there is an effect that the visibility for the users is enhanced, and the access log information can be replaced by various properties desired by the users.

Further, by the aggregation process, the access log can be aggregated for every item, arranged in accordance with classification defined by the users, and presented to the users. Thus, there is an effect that it is possible to provide an interface with which accessed data or access frequency can be grasped intuitively with good visibility by the users.

Next, description will be made of a second embodiment of the present invention.

According to the second embodiment, in the access log edition/aggregation processing program 104, access log data is extracted, translated and aggregated in a period from the time when an object was created till the time when the object was deleted. Thus, optimization of the access to a database is supported to reflect the result of analyzing the life cycle of the object.

Figure 24:
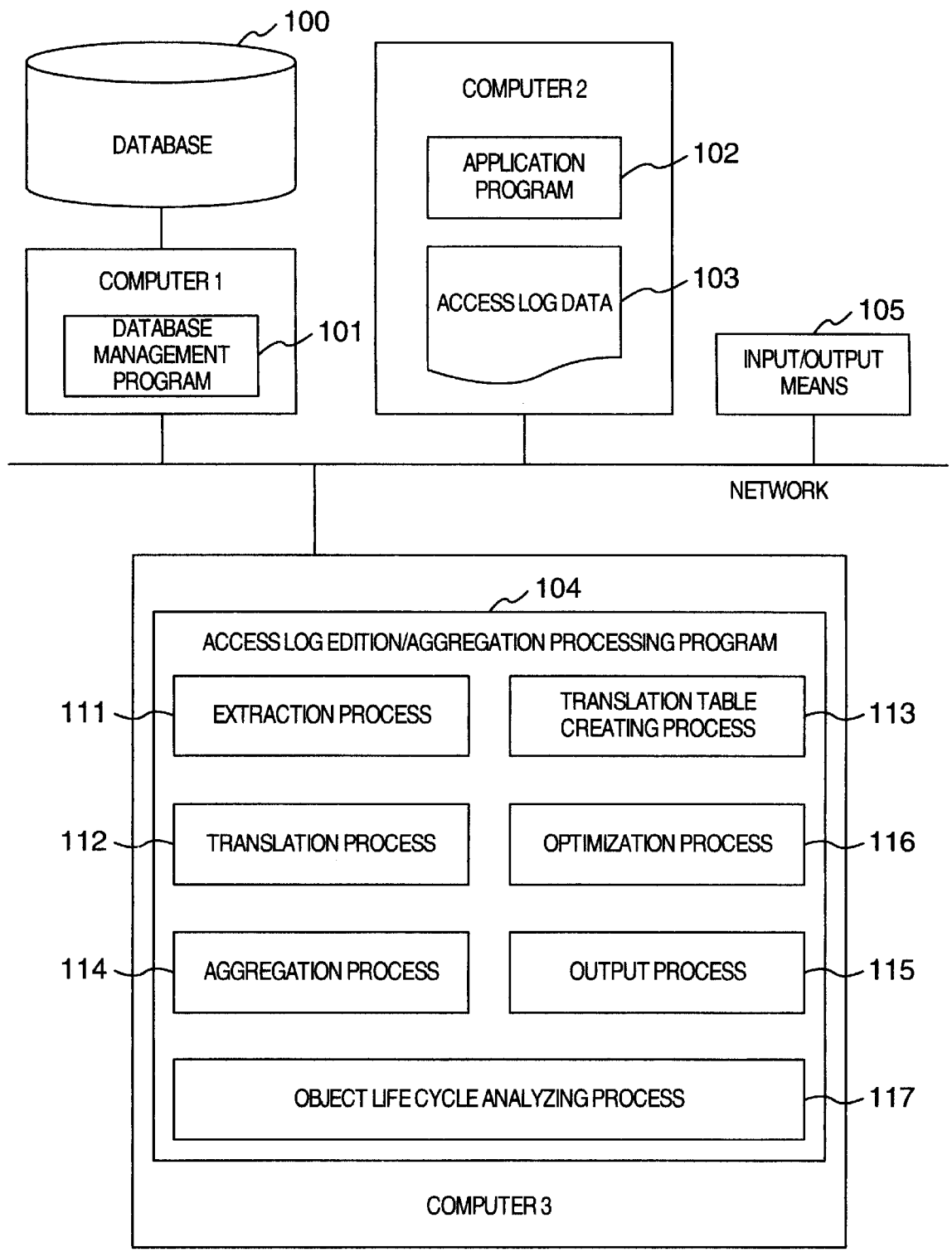
FIG. 24 is a block diagram showing the configuration of a database managing system according to another embodiment of the invention.

FIG. 24 shows the configuration of a database managing system according to the second embodiment of the present invention. The configuration of the system as a whole is the same as that in FIG. 1. However, only the access log edition/aggregation processing program 104 in the computer 3 is different. Particularly, the access log edition/aggregation processing program in this embodiment has a life cycle analyzing process 117.

Figure 25:
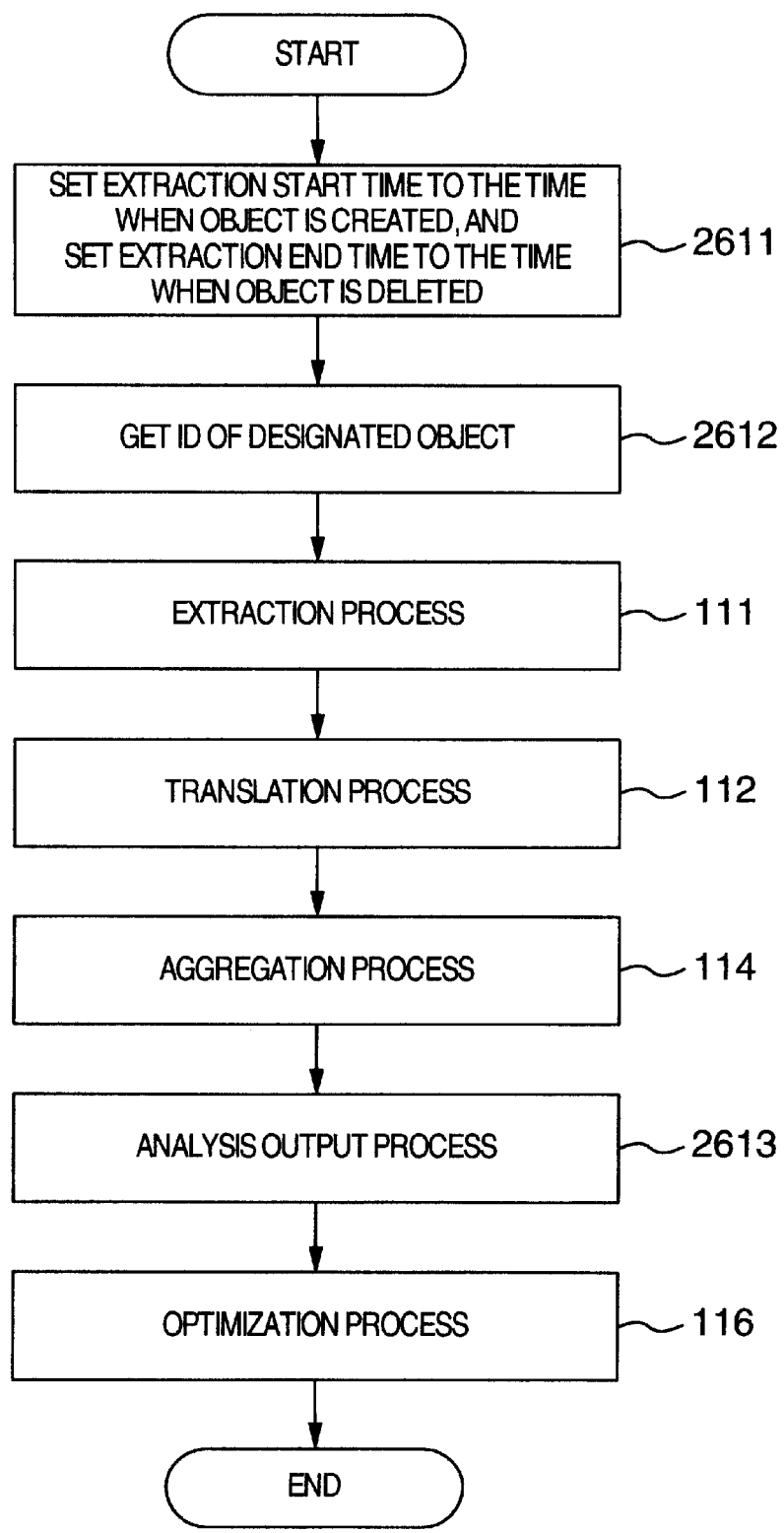
FIG. 25 is a flow chart of an object life cycle analyzing process.

FIG. 25 shows a flow chart of the life cycle analyzing process 117.

In the life cycle analyzing process, an extraction process is carried out while the start time of the extraction process is set to be the time when an object was created and the end time of the extraction process is set to be the time when the object was deleted. This is followed by a translation process (112) and an aggregation process (114). Here, in order to analyze the object over its life cycle, aggregation is carried out upon the number of document processing commands accessed in a period from the time when each object was created to the time when the object was deleted. On the basis of the result of the aggregation, the average life of the objects is obtained in an analysis process (2613). The average life and the aggregation result of the number of command issues are compared, analyzed, and statistically analyzed. Thus, the result is outputted.

Figure 26:
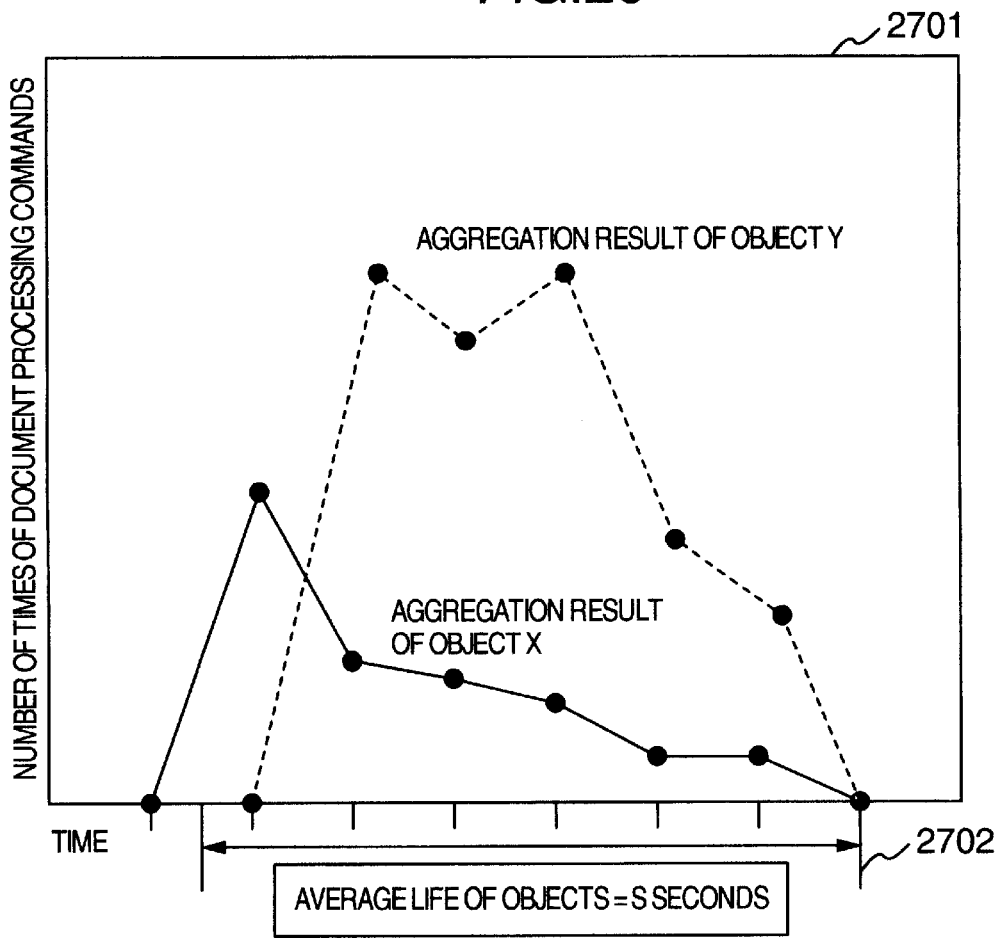
FIG. 26 is an illustration showing another example of an output by a screen image.

FIG. 26 shows the analysis and the output in an screen image by way of example. In this example, an average life of objects is obtained, and the frequency of the number of document processing commands issued during this average life is analyzed. When the result of the analysis is just as shown in FIG. 26, for example, assume that commands issued by half the average life occupied 80% of commands issued in the whole of the life of an object. That is, this means that 80% of all the commands for the object were intensively issued before the object reached half the average life. In addition, assume that commands issued by three fourths of the average life occupied 90% of the whole. When such an analysis result is obtained, inquiries are sent to a user in a guidance image 2704 (FIG. 26) as to whether the user adds a rule for optimizing the processing on the basis of the analysis result. If the user indicates addition, a rule as shown in FIG. 26 is added to judgement rules for analyzing the life cycle (FIG. 27). Incidentally, this process may be operated automatically without user's judgement.

FIG. 27 shows an example set of the judgement rules to be added. In this example, there is a tendency for the access frequency to an object to increase when the existence time of the object (that is, from the time when the object was created to the present moment) is shorter than 50% of the average life. In this case, optimization is carried out so that the object is loaded into a cache memory of the computer 1, priority is given to a command or a process, or an index is created. On the contrary, when the existence time of the object exceeds 75% of the average life, there is a tendency for the access to decrease. In this case, optimization is carried out so that the object is saved on a backup, or the priority of a command or a process is reduced.

Figure 28:
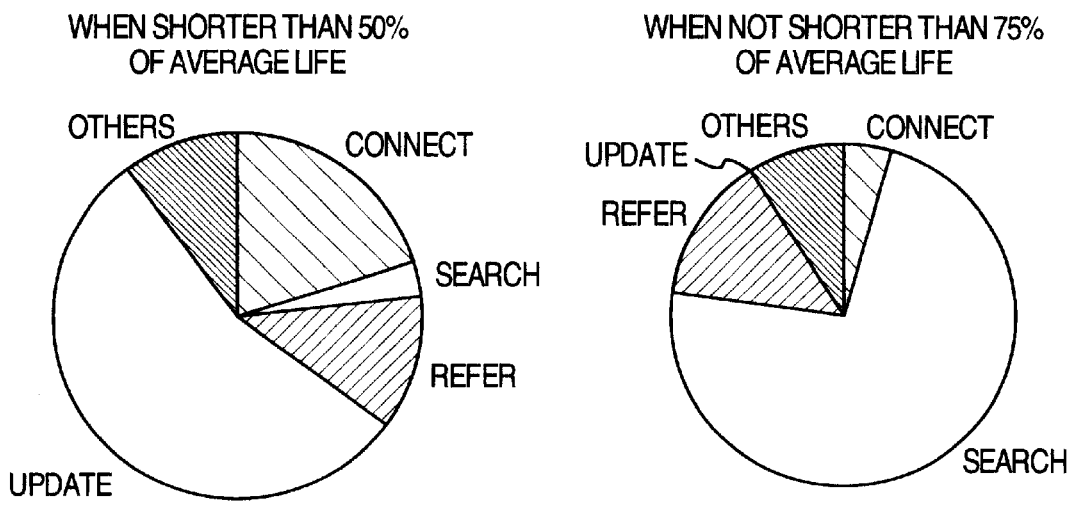
FIG. 28 is an illustration showing another example of an output by a screen image.

Further, FIG. 28 shows an example in which aggregation was performed on the details of the document processing commands. In an analysis result 2901 in this example, the number of update command to be issued is the largest when the existence time of an object is shorter than 50% of the average life of objects. However, the number of reference command to be issued becomes larger when the existence time is not shorter than 50% and shorter than 75% of the average life. Then, queries are sent in a guidance image 2902 as to whether the user adds a rule on the basis of such an analysis result. If addition is selected, a judgement rule is added as shown in FIG. 28. In the example of FIG. 29, when the existence time of an object is shorter than 50% of the average life, optimization is carried out in accordance with the contents of document processing commands in addition to the optimization process in FIG. 27. For example, priority is given to an object update processing command or an update processing step, and exclusive control is carried out for updating the object. On the contrary, when the existence time of the object exceeds 75% of the average life, priority is given to search processing, and it is made necessary to create an index for carrying out search at a high speed. In addition, because the object is not updated, the system is optimized so that exclusive control of the object is prohibited.

Thus, according to the second embodiment, in addition to the effects described in the first embodiment, it is further possible for a user to manage a database and access data optimally and efficiently in accordance with the life cycle of each object.

As described above, according to this embodiment, access information such as access frequency to data and access categories is edited, aggregated and analyzed with an access log to a database as input. Thus, this information can be presented to a user in a way easy to be understood, so that the user can be supported on database management.

Further, according to this embodiment, it is possible to provide a database optimizing method for locating data optimally in accordance with optimization judgement rules defined by the user.

According to the present invention, a user obtains an aggregation result of access frequency to data, access categories, and so on, using an access log to a database. Thus, the user can carry out optimal management of the database.

It will be further understood by those skilled in the art that the foregoing description has been made on embodiments of the invention and that various changes and modifications may be made in the invention without departing from the spirit of the invention and scope of the appended claims.

What is claimed is:

1. A computer-executable database management program implementing a method for managing a database, said method comprising the steps of:
   extracting log information satisfying predetermined conditions from among log information of an application program having accessed to a database; and
   rearranging data in said database in accordance with predetermined rules on the basis of commands included in said extracted log information.

2. A database management program according to claim 1, said method further comprising:
   obtaining an existence time of data to be accessed by said commands included in said extracted log information, and change stored positions of data to be accessed by said application program in accordance with said existence time and commands to be executed in said existence time.

3. A database management program executable with a computer, comprising:
   a function that when a plurality of commands to access a database are issued, said issued commands are executed in accordance with predetermined priorities so as to access a database;
   a function to extract log information satisfying predetermined conditions from log information of an application program gaining access to said database; and
   a function to increase priorities of commands included in said extracted log information more frequently than a predetermined value.

4. A database management program according to claim 3, further comprising:
   a function to obtain an existence time of data to be accessed by said commands included in said extracted log information, and change priorities of data to be accessed by said application program in accordance with said existence time and commands to be executed in said existence time.

5. A database management program comprising:
   a function to access a cache memory or a database in accordance with an issued command;
   a function to extract log information satisfying predetermined conditions from log information of an application program gaining access to said database; and
   a function to store, in said cache memory, data accessed by commands included in said extracted log information more frequently than a predetermined value.

6. A database management program according to claim 5, further comprising:
   a function to obtain an existence time of data to be accessed by said commands included in said extracted log information, and change stored positions of data to be accessed by said application program in accordance with said existence time and commands to be executed in said existence time.

7. A database system comprising:
   a client terminal for executing applications;
   a database managing terminal for accessing a database in accordance with a command sent from said client terminal; and
   a database managing portion for extracting log information satisfying predetermined conditions among log information of an application program executed by said client terminal and having accessed, and rearranging data in said database in accordance with predetermined rules on the basis of commands included in said extracted log information.

8. A database system comprising:
   a client terminal for executing applications;
   a database managing terminal for accessing a database in accordance with a command sent from said client terminal; and
   a database managing portion for extracting log information satisfying predetermined conditions among log information of an application program having accessed to said database, and increasing priorities of commands included in said extracted log information more frequently than a predetermined value.

9. A database system comprising:
   a client terminal for executing applications;
   a database managing terminal for accessing a database in accordance with a command sent from said client terminal; and
   a database managing portion for extracting log information satisfying predetermined conditions among log information of an application program having accessed to said database, and storing, in a cache memory, data accessed by commands included in said extracted log information more frequently than a predetermined value.

10. A method for managing a database system having a client terminal for executing applications, and a database managing terminal for accessing a database in accordance with a command sent from said client terminal, comprising the steps of:

extracting log information satisfying predetermined conditions among log information of an application program having accessed to said database; and rearranging data in said database in accordance with predetermined rules on the basis of commands included in said extracted log information.

11. A method according to claim 10, further comprising the steps of:

obtaining an existence time on said database of data to be accessed by said commands included in said extracted log information; and relocating stored positions of data to be accessed by said application program in accordance with said obtained existence time and commands to be executed in said existence time.

12. A method according to claim 10, further comprising the step of:

increasing execution priorities of commands included in said extracted log information more frequently than a predetermined value.

13. A method according to claim 10, further comprising the step of:

storing, not in said database but in a cache memory, data to be accessed by commands included in said extracted log information more frequently than a predetermined value.

14. A database optimizing system for use in a database system including a client terminal for executing applications, and a database managing terminal for accessing a database in accordance with a command sent from said client terminal; comprising:

extraction means for extracting log information satisfying conditions predetermined through said client terminal, among log information of an application program gaining access to said database; and means for rearranging data in said database in accordance with predetermined rules on the basis of commands included in said extracted log information.

15. A database optimizing system according to claim 14, further comprising:

means for generating a translation table from data extracted by said extraction means on the basis of translation rules defined by a user;

translation means for translating said extracted data on the basis of said translation table;

aggregation means for aggregating said extracted data or said translated data; and optimization means for optimally locating said extracted data on the basis of an aggregation result from said aggregation means.

16. A database optimizing program for use in a database system including a database, a client terminal for executing applications, and a database managing terminal for accessing said database in accordance with a command sent from said client terminal; comprising the steps of:

extracting log information satisfying conditions established through said client terminal, among log information of an application program gaining access to said database; and rearranging data in said database in accordance with predetermined rules on the basis of commands included in said extracted log information;

said rearranging step including:

generating a translation table from said extracted log information on the basis of translation rules defined by a user;

translating said extracted data on the basis of said translation table;

aggregating said extracted data or said translated data; and optimally locating data in said database on the basis of an aggregation result.

* * * * *

UNITED STATES PATENT AND TRADEMARK OFFICE
CERTIFICATE OF CORRECTION

PATENT NO. : 6,832,227 B2  Page 1 of 1
APPLICATION NO. : 10/046981
DATED : December 14, 2004
INVENTOR(S) : Y. Seki et al.

It is certified that error appears in the above-identified patent and that said Letters Patent is hereby corrected as shown below:

ON THE TITLE PAGE

Please correct (73) Assignee to read as follows:

(73) Hitachi, Ltd., Tokyo (JP)
Hitachi Software Engineering Co., Ltd.,
<u>Yokahama (JP)</u>

Signed and Sealed this

Fourth Day of August, 2009

JOHN DOLL
*Acting Director of the United States Patent and Trademark Office*

UNITED STATES PATENT AND TRADEMARK OFFICE
CERTIFICATE OF CORRECTION

| | |
|---|---|
| PATENT NO. | : 6,832,227 B2 |
| APPLICATION NO. | : 10/046981 |
| DATED | : December 14, 2004 |
| INVENTOR(S) | : Y. Seki et al. |

It is certified that error appears in the above-identified patent and that said Letters Patent is hereby corrected as shown below:

ON THE TITLE PAGE

Please correct (73) Assignee to read as follows:

(73) Hitachi, Ltd., Tokyo (JP)
Hitachi Software Engineering Co., Ltd.,
Yokohama (JP)

This certificate supersedes the Certificate of Correction issued August 4, 2009.

Signed and Sealed this

Sixth Day of April, 2010

David J. Kappos
*Director of the United States Patent and Trademark Office*